United States Patent
Bornstein et al.

(10) Patent No.: US 7,483,596 B2
(45) Date of Patent: Jan. 27, 2009

(54) PERFORMANCE DIGITAL IMAGE SENSING

(75) Inventors: William Bornstein, Stormville, NY (US); Anthony Cappa Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 10/755,888

(22) Filed: Jan. 13, 2004

(65) Prior Publication Data
US 2005/0151861 A1   Jul. 14, 2005

(51) Int. Cl.
*G06K 7/10* (2006.01)

(52) U.S. Cl. .................. 382/312; 382/274; 382/167; 382/314; 382/315; 382/318; 358/497

(58) Field of Classification Search .......... 382/312, 382/274, 167, 314–315, 317–318, 321; 348/219.1, 348/275, 222.1; 358/497, 251, 246
See application file for complete search history.

(56) References Cited

U.S. PATENT DOCUMENTS

| | | | |
|---|---|---|---|
| 5,291,293 A * | 3/1994 | Kapan | 348/246 |
| 6,236,430 B1 * | 5/2001 | Suzuki et al. | 348/219.1 |
| 6,567,192 B1 * | 5/2003 | Toyomura et al. | 358/497 |
| 2005/0134712 A1 * | 6/2005 | Gruhlke et al. | 348/272 |

\* cited by examiner

*Primary Examiner*—Ali Bayat
(74) *Attorney, Agent, or Firm*—Mark E. McBurney; Schubert Osterrieder & Nickelson PLLC (57) ABSTRACT

Methods to capture a digital image are disclosed. Embodiments include methods for taking multiple color data readings with a series of sensing elements in one collecting location during a single exposure, associating the collecting location with a pixel, and calculating a color value for the pixel based on the multiple color data readings. The method may include directing light successively to the sensing elements of the series of sensing elements within one exposure via reflective optics. The method may include determining that a sensing element of the series of sensing elements is defective. The method may include redirecting light to align a non-defective sensing element of the series of sensing elements with the collecting location. The non-defective sensing element and the defective sensing element may be associated with the same color.

5 Claims, 5 Drawing Sheets

PERFORMANCE DIGITAL IMAGE SENSING

FIELD OF INVENTION

The present invention is in the field of color sensing. More particularly, the present invention relates to methods and arrangements to capture a digital image.

BACKGROUND

A digital image sensor is an integral part of several electronic systems including computers, cell phones, digital photography systems, robotics vision systems, security cameras, medical instruments, color matching applications and other color photosensitive devices. One digital image sensor, such as a TCS230 Programmable Color Light-to-Frequency Converter manufactured by TAOS, Inc., typically includes sensing elements, which may be sensitive to a broad range of frequencies of light. Some systems include lenses that are added and positioned on top of each sensing element to collect light and to make the sensing elements more sensitive.

Adding color filters to light sensors on an image sensor to specifically be color sensing elements may capture the brightness of the light that passes through and provide color sensing for red, green, and blue, for example. Thus, with color filters in place, color sensing elements typically record only the brightness of the light that matches its filler and passes through it while other colors are blocked. For example, a pixel with a red filter senses the brightness of only the red light that strikes it.

The color sensing elements appear in a photodiode grid consisting of groups of individual color sensing elements, each checkered throughout the grid on the same optical plane. For example, a group may include individual color sensing elements, for example, a red sensing element, a green sensing element, a blue sensing element, and sometimes a clear sensing element with no filter for intensity information. All of the photodiodes of the same color are typically connected in parallel. With the TCS230, the color selected for use during operation is dynamically selectable via two programming pins. If the output is digital, the output for individual color sensing elements is typically a square wave whose frequency is directly proportional to the intensity of the selected color.

As common as digital image sensors are to electronic systems, problems of defect sensitivity, spatial error, inference error and interpolation calculations make these benefits difficult to realize. Defect sensitivity is introduced in the fabrication of the sensing array in the conventional approach. Spatial error occurs because readings are taken at different points than the actual point interpolated; inference error takes place because each reading is not a direct observation. And, interpolation calculations involve a great deal of two-dimensional computation to be performed on each image in real time after each exposure through mathematical algorithms used to determine an appropriate color to assign to pixels in an image. In particular, algorithms typically interpolate visual colors at various points on a grid using a checkering of red, green, and blue sensing elements. Such interpolation computation requires sophisticated processing capability to be built into the imaging device. These interpolations translate into increased hardware cost, increased energy consumption, and slower cycle time for the image capturing device.

Unfortunately, this interpolation typically also introduces artifacts into the image resulting from the mathematical interpolation. An artifact is a distortion of the image that degrades image quality, for example, stair steps on a diagonal line.

One solution to defect sensitivity is to use firmware to ignore the information coming from a single sensing element of an array of sensing elements that has been found to be defective after its manufacture, and replace that information with additional interpolation from nearby elements. This solution, however, degrades image quality.

One solution to spatial error, inference error and interpolation has been making digital image sensors with a technology called X3, where the sensing elements are stacked vertically to read light at the same time. The colors, however, tend to appear undersaturated and cannot always be tuned to brilliance with software. In addition, vertically stacked sensing elements produce excessive noise, especially in shadows and red hues. The noise problem becomes even more severe at higher International Standards Organization (ISO) settings for photographic sensitivity; for example, ISO 400 is a well-known photographic sensitivity in the art of photography and typically indicates a digital emulation of a resulting traditional exposure based on a given shutter speed and aperture size. ISO 400 shots taken with X3 technology involved show multicolored noise that would ruin many prints. As the X3 sensor does not use a conventional checkerboard array of elements sensitive to a single color, use of the X3 sensor requires redesigning the camera system to accomodate the X3 sensor; such redesign increases system design costs and lengthens product development cycles. Furthermore, the X3 sensor outputs raw sensor data, requiring additional processing outside the camera, which is time-consuming and inconvenient.

Therefore, there is a need for methods and arrangements capable of capturing quality images with less spatial error, inference error and interpolation.

SUMMARY OF THE INVENTION

The problems identified above are in large part addressed by methods and arrangements to capture a digital image. One embodiment provides a device to capture a digital image. The device contemplates a series of sensing elements, adapted to collect multiple color data readings to determine a color value for a pixel in an image and reflective optics to redirect light to the series of sensing elements successively within one exposure.

One embodiment provides a method for an exposure of a digital image sensor. The method generally includes taking multiple color data readings with a series of sensing elements in one collecting location during a single exposure. The method may include directing light successively to the sensing elements of the series of sensing elements within one exposure via reflective optics. The method may include determining a sensing element of the series of sensing elements is defective. The method may include redirecting light to align a non-defective sensing element of the series of sensing elements with the collecting location. The non-defective sensing element and the defective sensing element may be associated with the same color. The method may include associating the collecting location with a pixel position in an image to be portrayed, and determining a color value for the pixel position in the image based on the multiple color data readings.

An additional embodiment provides a machine-accessible medium to capture a digital image. The medium includes instructions, which when executed by a machine, cause said machine to perform operations, that generally include taking multiple color data readings with more than one sensing elements of an array in one collecting location during a single exposure, associating the one collecting location with a pixel position in an image to be portrayed, and determining a color value for the pixel position in the image based on the multiple color data readings. Further embodiments provide instructions determining a sensing element of the more than one sensing elements is defective, wherein the sensing element is associated with a color, and positioning the array to align a non-defective sensing element of the more than one sensing elements with the one collecting location, wherein the non-defective sensing element is associated with the color.

A further embodiment provides a system to capture a digital image. The system contemplates a plurality of sensing elements, including light sensors covered with colored filters to receive light and to generate filtered readings of data of the light. The system also includes a motor coupled to the plurality of light sensors, wherein the motor is configured to move the plurality of light sensors, and moving logic coupled with the motor to move the plurality of light sensors in succession into the single collecting location to take the filtered readings. Further, the system includes a memory to associate the filtered readings from a collecting location with a pixel position in an image and to store the association into a location in memory and a calculator to calculate a color value based upon the filtered readings from the plurality of light-sensors.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Introduction

The following is a detailed description of embodiments of the invention depicted in the accompanying drawings. The embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements are contemplated to capture a digital image. In many embodiments, hardware and/or software may implement logic to move a sensing array of photosensitive elements during one exposure to allow multiple sensing elements to receive the same light falling at each pixel position in an image. During one exposure, the sensing array may be read several times. During a first read, information from a first color sensing element, for example red, is captured. The sensor is then moved so that a second color sensing element, for example blue, is positioned in the collecting location that the first color sensing element occupied during the first read. Once the movement is complete, information from the second color sensing element is captured. Then, the captured information is used to determine a color value for a pixel. Determining a color value may include combining the captured information as component values of the pixel color value.

Additionally, many embodiments provide methods to recover from defective sensing elements. In one embodiment, the motion of the sensor can be adjusted to redirect the light intended for a defective sensing element to another nearby non-defective sensing element. Thus, no loss of image quality accompanies that defective sensing element.

Because the information at each location in the focal plane is being sensed directly by three sensing elements, two-dimensional interpolation may be eliminated to calculate the appropriate color to be assigned to that location. Eliminating real-time complex interpolation may reduce imaging hardware system cost, improve system power efficiency, and improve system cycle time.

DETAILED DESCRIPTION

Figure 1:
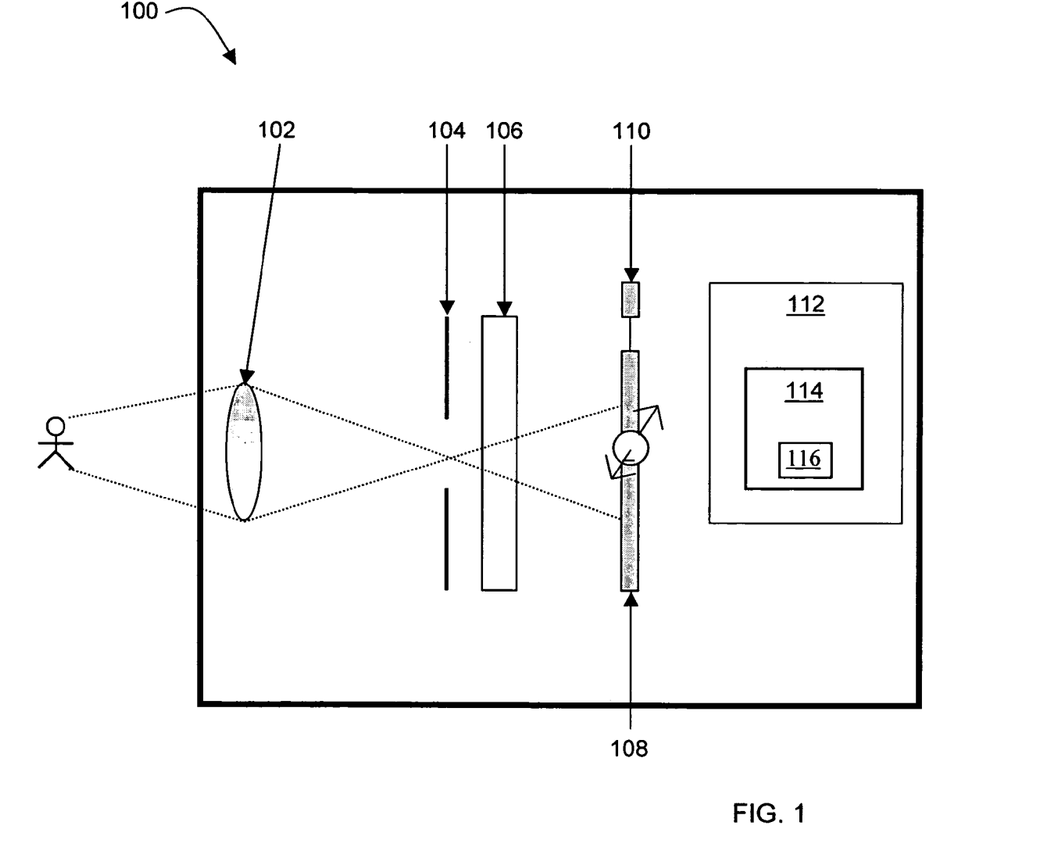
FIG. 1 depicts an embodiment of a system including a lens, software, and an image sensor having sensing elements to capture a representation of a visual image.

Turning now to the drawings, FIG. 1 depicts an embodiment of a system (100) to capture a representation of a visual image. The system (100) captures color for the visual image during one exposure by taking three distinct readings with a physical difference in placement between an image sensor (108) and a lens (102), typically between readings. In one embodiment, the system (100) is a digital camera including a lens (102) to focus.

More particularly, the image sensor (108) of the system (100) provides capability to capture colors of an image. The image sensor (108) may be mounted, for example, with a complimentary metal oxide semiconductor (CMOS) chip included on a laminate substrate. The image sensor (108) includes sensing elements to take readings and record color images, wherein the elements are typically in fixed locations on the image sensor (108).

While capturing one image, the image sensor (108) is able to move multiple times and gather multiple readings by its sensing elements. To move the image sensor (108) quickly, especially within a single image exposure, a motor (110) may be mounted on the image sensor (108). The motor (110) is typically capable of moving the image sensor (108) both laterally and vertically. In one embodiment, this motor (110) is a piezoelectric motor, such as a Piezoelectric Micropositioning Motor Model PDA130, manufactured by EDO Corporation. Piezoelectric motors are based on quartz crystals generating an electric field when stressed along a primary axis. The piezoelectric quartz crystals exhibit a relationship between mechanical strain and voltage across their surfaces. Specifically, when compressed or pulled, a piezoelectric crystal may build up alternate charges on opposite faces, thus acting like a capacitor with an applied voltage. Piezoelectricity current can then be generated between the faces. On the other hand, when subjected to an external voltage, the crystal will expand or contract accordingly. This process is functionally analogous to magnetization of material shapes containing iron. Once poled, the material exhibits useful piezoelectric properties. Piezoelectric motors use this poled ceramic shape to create motion with the use of periodic electric fields, which in some embodiments are sinusoidal.

The system (100) also includes equipment to support the functionality of the image sensor (108). In one embodiment, the system (100) includes one or more filters (106), for example, an infrared absorption filter to remove infrared light that is not contributing to the physical image and possibly degrading quality of readings taken by the image sensor (108). In one embodiment, the system (100) also includes a shutter mechanism (104). When the shutter (104) is open, the system (100) may receive light to the image sensor (108). In other embodiments, the shutter (104) may not be a physical means, but software where the photosensitive elements on the image sensor (108) may receive light only at intervals that are controlled by software. The camera (100) may also include firmware (114) on a circuit board (112) that includes software (116), for example, to control the shutter opening and closing and to manipulate the sensor to capture images.

Figure 2:
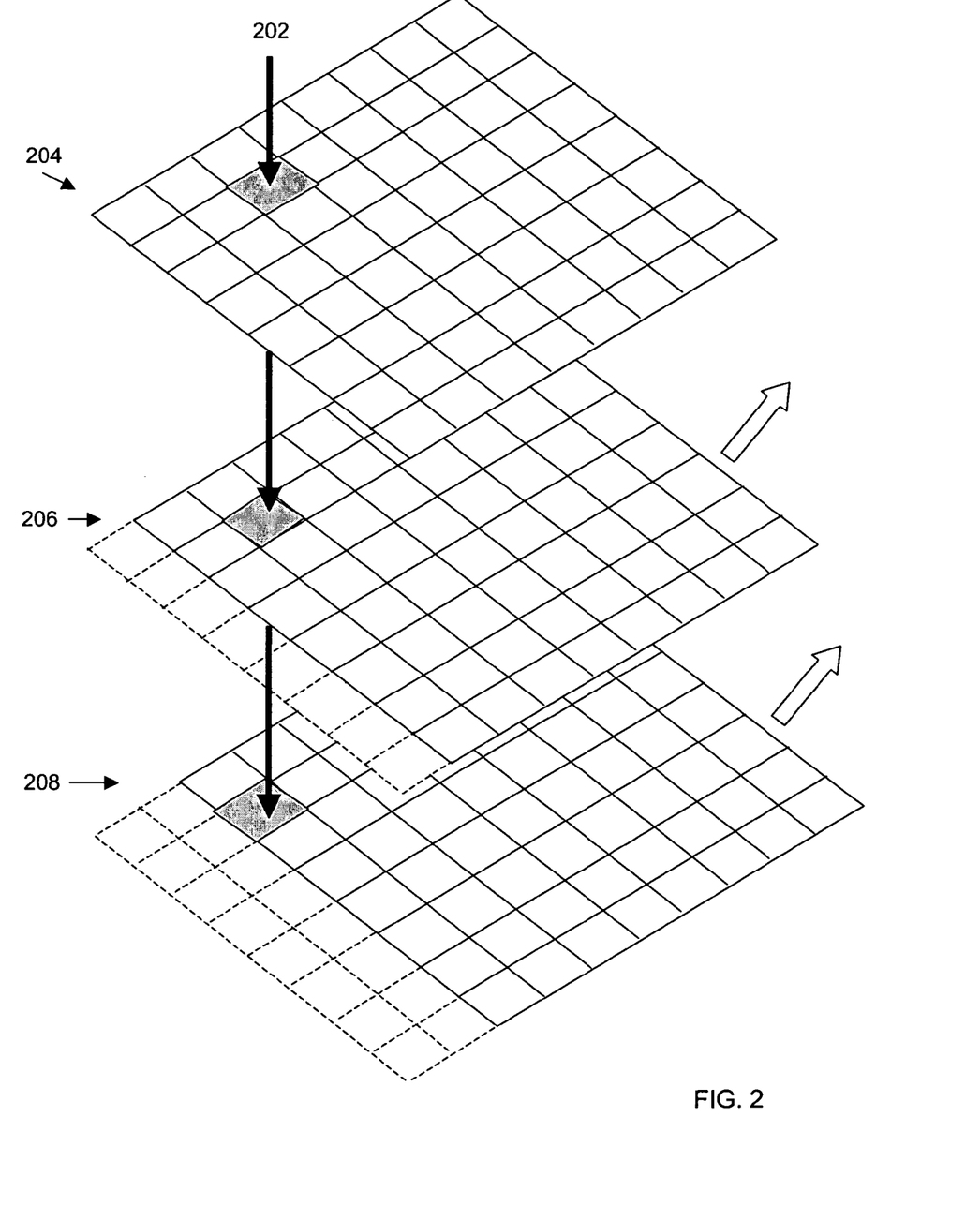
FIG. 2 depicts sensing elements capturing data from light falling on an image sensor.

Sensing elements are depicted capturing color data readings from light (202) falling on an image sensor in an image position (204) in FIG. 2, in which the same light rays (202) hit multiple different sensing elements at sequential time periods, for example $Time_0$, $Time_1$, and $Time_2$, within a single exposure. Captured color data readings may include brightness, hue, saturation, intensity, or other data describing light. Rays of light (202) are falling in one collecting location of an image sensor position (204) at the beginning of a capture time. Then, the image sensor is moved by, for example, the width of one sensing element until another sensing element is receiving the light (202) to capture further data in a new image sensor position (206). Next, the image sensor position (204) is moved another length, for example, a width of a photosensitive element until an additional sensing element is receiving the light (202) to take another data reading in another image sensor position (206). In further embodiments, FIG. 2 includes additional sensor positions for data captures to other sensing elements included on the image sensor. Patterns of movement of the image sensor are further discussed in FIG. 3.

As an alternative to the movement of the image sensor in FIG. 2, reflective optics may be used. Instead of moving a series of optical sensing elements, adapted to collect multiple color data readings to calculate a color value for a pixel in an image, some reflective optics redirect light to the series of optical sensing elements successively within one exposure. In one embodiment, the series of optical sensing elements comprises a first element sensitive to red light, a second element sensitive to blue light, and a third element sensitive to green light. Specifically, the reflective optics may include a digital light processor including a digital micromirror device and control circuitry. In further embodiments, the reflective optics may include one or more mirrors to scan light to the series of sensing elements in conjunction with, for example, a digital light processor.

Figure 3A:
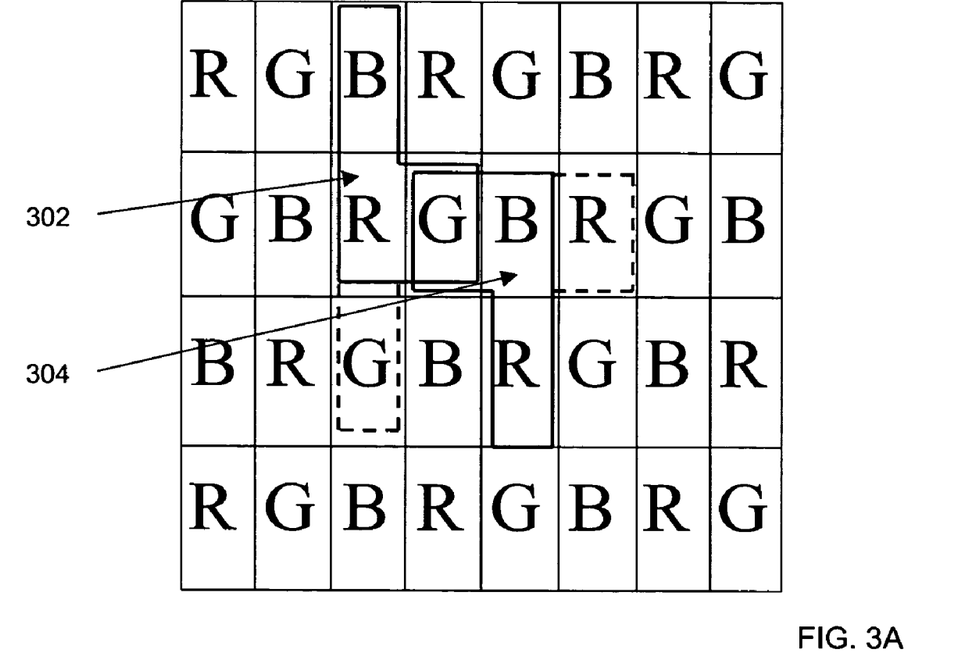
FIG. 3A depicts patterns of movement of an image sensor during data captures of an image.

Turning to FIG. 3, some patterns (302, 304) of movement of an image sensor (300) during data captures of an image, for example three captures, are illustrated. In one embodiment, each sensing element of the image sensor (300) captures different information; for example, red, blue, or green. The sensing elements may each include a light sensor to detect luminance and a color filter. Thus, sensing elements featuring a red sensing element, blue sensing element, or green sensing element may incorporate a light sensor and a red filter, blue filter, or green filter to capture and indicate an amount of red light, blue light, or green light, respectively. In further embodiments, sensing elements may be sensitive to cyan, orange, yellow, magenta, or other colors.

In one embodiment, to detect and record three different data captures of the same light by a red sensing element, blue sensing element, and green sensing element, the image sensor (300) moves in a pattern (302, 304) between data captures by sensing elements. For example, FIG. 3 illustrates an L-shaped pattern (302). In the pattern (302), a blue sensing element captures data first; then, a red sensing element captures data; and lastly, a green sensing element captures data. Another pattern (304), shaped like a backwards P is also shown to be used in other embodiments. In the pattern (304), data is captured sequentially by a green sensing element, blue sensing element, and then a red sensing element.

As the image sensor is moved between data captures, sensing elements move between various collecting locations during an exposure. The sensing elements at the edge of the image sensor also move in and out of collecting locations and do not necessarily capture the same number of data readings. Thus, the patterns (304, 306) of the image sensor do not necessarily provide the same number of multiple captures for every edge sensing element as for interior sensing elements of the image sensor. One embodiment accounts for this difference with extra rows and columns to form an outline of sensing elements around the image sensor. Within the outline, sensing elements do not necessarily equally contribute to multiple data readings to supply pixels in an image and may be ignored from determining the pixels. An additional embodiment to account for the possible difference of numbers of edge and interior sensing elements' captures includes additional captures, for example, in the case of aiming for three data readings per sensing element, instead of three captures, six captures may occur: three in a pattern, then an additional one on the edge moved away from last, and an additional two on the edge moved away from first. Another embodiment to account for the possible difference of numbers of edge and interior sensing elements' captures includes interpolating the color values of the edge sensing elements from the interior sensing elements. In yet another embodiment, edge sensing elements with one value may produce pixels that are mere duplicates of pixels produced by the nearest interior sensing element.

In several embodiments, the image sensor (300) provides a solution for situations in which a sensing element is defective. First, a sensing element is found to be defective by one of several ways. In one embodiment, the image sensor (300) may perform a self-test to individually address each sensing element to simulate a burst of light. A sensing element may be labeled defective if it fails to respond. In another embodiment, a system (100) such as in FIG. 1 might take a test exposure simulating no light entering the lens. Any specks of color that diminish a pure black image would indicate those associated sensing elements are defective. Next, a pure white image is simulated and any sensing elements detracting from the image are defective. In a further embodiment, the image sensor (300) runs a test run and queries the user to respond that all of the sensing elements are functioning, by showing, for example, a red lattice, a blue lattice, and then a green lattice.

With the knowledge that a sensing element is defective, the image sensor (300) may alter its movement of data collection. For example, if the green sensing element of the pattern (302) is defective, the pattern (302) may be altered so that the image sensor (300) moves in the linear pattern from the blue sensing element to the red sensing element of the pattern (302) and continuing in the same direction to include the next sequential green sensing element instead. In this way, the image captured does not lack any information that it would have included if the original green sensing element had been fully functional. As another example, if the image sensor (300) is following the pattern (304), and the red sensing element becomes defective, the pattern (304) could be diverted to the red sensing element on the right after the blue sensing element. In another embodiment, software such as software (116) in FIG. 1, may add additional data captures to accommodate completing the gathering of multiple data readings per sensing element, for example four captures.

Figure 3B:
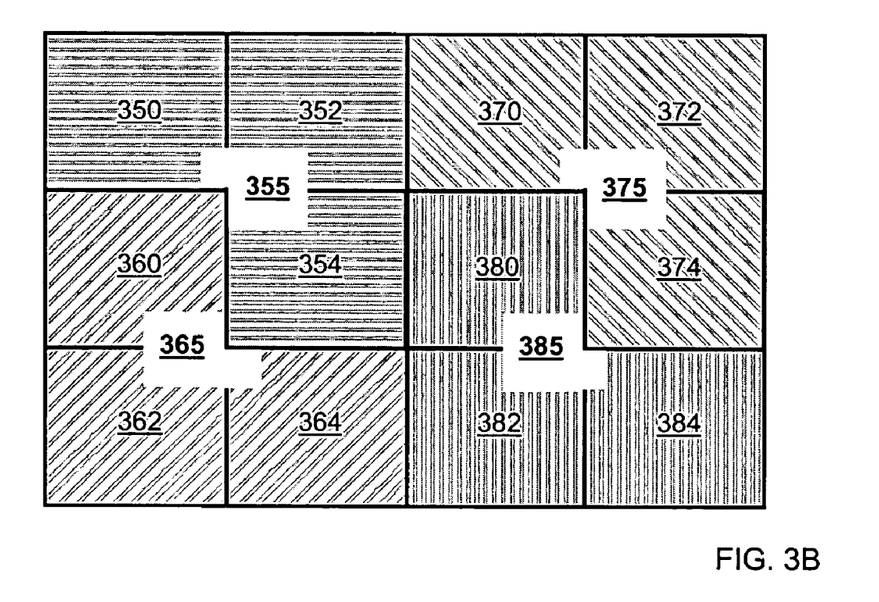
FIG. 3B depicts examples of conversions of sensing element readings to pixel information in an output image.

FIG. 3B depicts examples of conversions of sensing element readings to pixel information in an output image. FIG. 3B includes sensing elements (350, 352, 354, 360, 362, 364, 370, 372, 374, 380, 382, 384) to capture multiple data readings in accordance with the present invention. In one embodiment, the sensing elements (350, 352, 354, 360, 362, 364, 370, 372, 374, 380, 382, 384) capture three color readings, an amount each of red, blue, and green. The red, green, and blue values for each pixel are determined at the time of capture; thus, in displaying an image, each element (350, 352, 354, 360, 362, 364, 370, 372, 374, 380, 382, 384) may be directly associated with one or more pixel positions without further interpolation calculation.

In another embodiment, in displaying an image, groups of three sensing elements (350, 352, 354), (360, 362, 364), (370, 372, 374), (380, 382, 384) may be associated, and their data readings combined to provide several readings to interpolate a color value for resulting pixels (355), (365), (375), (385), for example. In this example, three elements are associated with one pixel position; however, any number of elements may be associated with any number of pixel positions.

Figure 4:
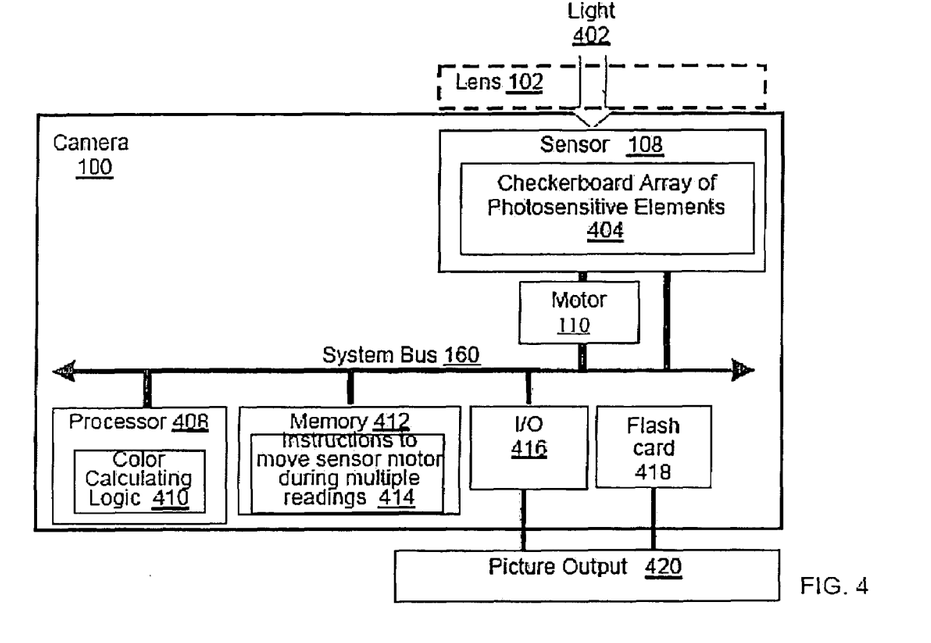
FIG. 4 depicts a block diagram of an embodiment of internal software and hardware of an imaging system including an image sensor, sensing elements, motor, processor, memory, and I/O to capture a representation of a visual image.

FIG. 4 depicts a block diagram of an embodiment of internal software and hardware of a camera (100) to capture a representation of a visual image. In this embodiment, light (402) enters through the lens (102) and falls on the image sensor (108) which includes an array of sensing elements (404). In some embodiments, these sensing elements (404) include different types of sensing elements that are checkered within a two-dimensional array. A motor (110) is also included to move the image sensor (108) between captures.

Camera (100) also includes a processor (408), memory (412), input/output (I/O) (416), flash card (418), and a system bus (406) to connect the camera's components. The processor (408) includes color calculating logic (410) within it to process data captures and to convert data captures from the sensor into pixel information. In one embodiment, the memory (412) includes instructions (414) to move the image sensor (108) with the motor (110) between multiple color readings. These instructions provide functionality for the motor (110) to move the image sensor (108) so sensing elements (404) line up in the same collecting location for data readings within a single exposure. Additionally, these instructions provide functionality for the image sensor (108) itself to capture multiple data readings per exposure. The I/O (416) manages receiving instructions from a user, importing an image from a flash card (418), capturing data from the image sensor (108) to transfer to the processor (408), and outputting a picture output (420) on an output pin or pins, and storing an image on the flash card (418).

In one embodiment, the internals of the camera (100) may be implemented with CMOS logic, for example, to provide the ability for the camera to function, turn on, expose the shutter, convert data captures from the sensor into pixel information, or write a resulting image file out to a compact flash card. In another embodiment, the image sensor may be implemented on a separate charged coupled device (CCD) integrated circuit chip. In a further embodiment, the internals of the camera (100) and the image sensor (108) are implemented on separate CMOS chips within the same camera (100) or other imaging system.

Figure 5:
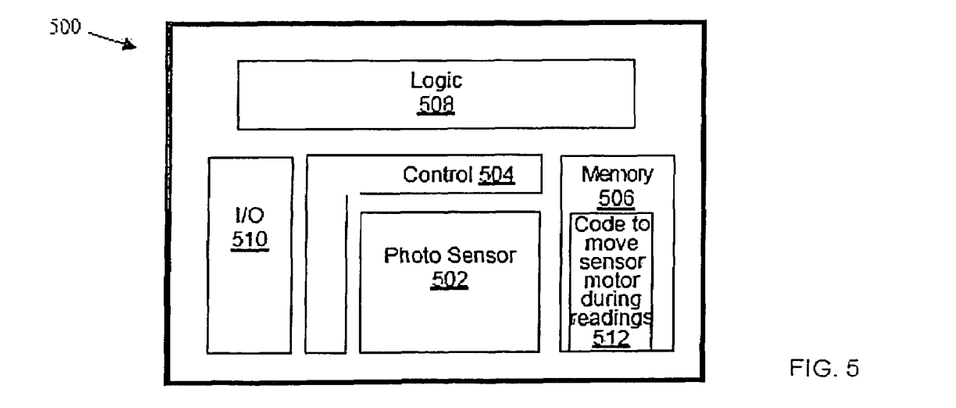
FIG. 5 depicts a block diagram of an embodiment of a CMOS chip implementation of an image sensor.

Turning to FIG. 5, a block diagram depicts an embodiment of an image sensor (500) implemented as a CMOS chip. The CMOS sensor chip (500) includes memory (506) which is typically a rectangular array of temporary storage RAM. A photosensitive array (502) of sensing elements is also included as well as some control circuitry (504) which may be amplifiers or register addressing circuitry or both around the outside of the photosensitive array (502) to provide an ability for information to be read out of the array (502). The CMOS sensor chip (500) also includes a portion whose function is I/O (510) to provide access to chip information. Additionally, the CMOS sensor chip (500) may include, hardwired into its circuit, certain logic functions (508) to repeatedly perform. For example, the logic (508) may contain logic to move the motor (110) or send data captured by the photosensitive array (502) to I/O (510). In one embodiment, an algorithm to combine data captured by the photosensitive array (502) into a pixel array may be hardwired into the circuitry of this CMOS sensor chip (500). In another embodiment, the algorithm is soft-wired in flash ROM (not shown) on the CMOS sensor chip (500). In a further embodiment, the algorithm is not stored on this CMOS sensor chip, but stored externally in a magnetic medium, flash memory, ROM, or the like, elsewhere in the camera (100). In this embodiment, the algorithm may be loaded into the CMOS sensor chip (500) when it is powered up.

Figure 6:
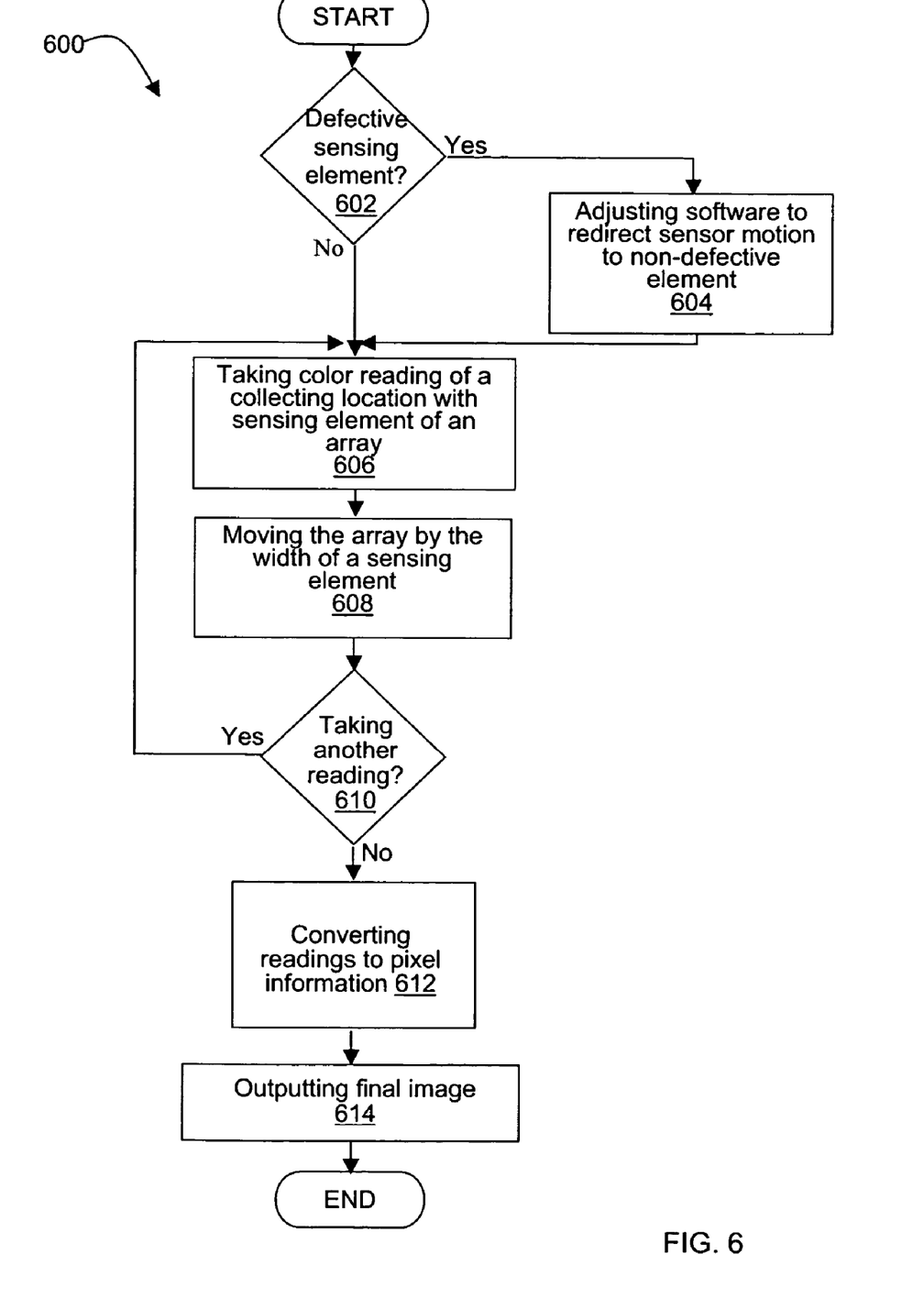
FIG. 6 depicts an example of a flow chart illustrating a method to capture a representation of a visual image.

Turning to FIG 6, an example of a flow chart illustrates a method to capture a representation of a visual image. Method (600) begins with element 602, during which an imaging system, such as a camera, determines whether any of its sensing elements are defective. If any sensing elements are defective, then the imaging system adjusts its software to redirect its image sensor motion to include a replacement non-defective element (element 604).

After either no sensing elements are found defective or software is completed being adjusted to accommodate for defective sensing elements, color readings are taken at a collecting location with a sensing element of an array (element 606). In one embodiment, the collecting location refers to a static physical position to receive a designated light falling in that location. In some embodiments, the array is moved between readings by the width of one sensing element to allow a new sensing element to analyze the same light and thus receive the light in the collecting location (element 608). The collecting location may be defined relative to the ray of light and refer to the location where optics focus rays of light on the image sensor. In one embodiment, while the image sensor is static, the reflective optics are able to redirect light to sensing elements successively within one exposure. For example, a digital light processor including a digital micromirror device and control circuitry may redirect light to the sensing elements successively within one exposure. For as many elements and readings from the collecting position are chosen, element 610 follows back to element 606.

After the data readings of color and luminance are taken, the captured information is used to create image information. Mathematical algorithms may be performed to convert the data readings to pixel information (element 612). Then, an image is outputted (element 614). For example, the pixel information may be stored to memory or sent out on a bus to another memory location or coupled device.

One embodiment of the invention is implemented as a program product for use with an image system such as, for example, as shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, indicate embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements for improved performance digital image sensing. It is understood that the form of the invention shown and described in the detailed description and the drawings are to be taken merely as examples. It is intended that the following claims be interpreted broadly to embrace all the variations of the example embodiments disclosed.

What is claimed is:

1. A method for exposing an image sensor, comprising:
   taking multiple color data readings with a series of sensing elements in one collecting location during a single exposure, wherein the taking comprises directing light successively to the sensing elements of the series of sensing elements within one exposure, the directing via reflective optics;
   determining a sensing element of the series of sensing elements is defective, wherein the sensing element is associated with a color;
   redirecting light to align a non-defective sensing element of the series of sensing elements with the one collecting location, wherein the non-defective sensing element is associated with the color;
   associating the one collecting location with a pixel position in an image to be portrayed; and
   determining a color value for the pixel position in the image based on the multiple color data readings.

2. The method of claim 1, wherein taking comprises taking multiple color data
   readings with more than one sensing elements, wherein the more than one sensing elements comprise color filters selected from a group of color filters comprising red, green, blue, cyan, orange, yellow, magenta, or clear.

3. The method of claim 1, wherein determining a color value comprises calculating the color value with at least one of the multiple color data readings.

4. The method of claim 1, wherein the directing comprises directing light to the series of sensing elements successively within one exposure, the directing via a digital micromirror and control circuitry.

5. The method of claim 1, wherein:
   the taking comprises taking multiple color data readings with a series of sensing elements of an array, the array comprising an image sensor;
   the array contains extra rows and columns of sensing elements forming an outline around the edges of the array; and
   the taking comprises taking fewer data readings during an exposure with one or more sensing elements of the outline than with sensing elements of the interior of the array.

* * * * *